(No Model.)

G. H. F. SCHRADER.
VALVE AND STOPPER.

No. 555,664. Patented Mar. 3, 1896.

WITNESSES:
Fred White
Thos. F. Wallace

INVENTOR.
George H. F. Schrader,
By his Attorneys,
Arthur E. Graser & Co.

UNITED STATES PATENT OFFICE.

GEORGE H. F. SCHRADER, OF NEW YORK, N. Y.

VALVE AND STOPPER.

SPECIFICATION forming part of Letters Patent No. 555,664, dated March 3, 1896.

Application filed October 13, 1894. Serial No. 525,775. (No model.)

*To all whom it may concern:*

Be it known that I, GEORGE H. F. SCHRADER, a citizen of the United States, residing in the city, county, and State of New York, have invented certain new and useful Improvements in Valves and Stoppers, of which the following is a specification.

This invention relates to valves and stoppers, and is particularly applicable for such valves as those used with pneumatic tires and such stoppers as those used with such valves or with water-bottles and similar devices.

Heretofore various expedients have been resorted to to construct a simple air-valve for tires of very small diameter and light weight, which can be readily filled to inflate the tire and opened to deflate it, and which shall be secure against leakage in use. These valves have had projecting stems pressed inwardly to open the valve for deflating and have had stoppers or caps containing a packing-washer for making an additional closure at the end of the valve when the tire is filled. Rubber has generally been used for such washer, and in screwing home the cap or stopper this rubber has been distorted between the opposing faces embracing it, to both of which it tends to adhere. This distortion quickly impairs the washer, and, further, the elasticity of the rubber as it is twisted when distorted acts to partially unscrew the cap or stopper when it is released after being screwed home, thus impairing the closure between the cap and valve-casing.

My present improvements aim to provide a simple and effective valve and an improved stopper in which the distortion of the washer will be avoided, and consequently its impairment reduced to the minimum, and the tendency of it to unscrew the stopper will be obviated.

To this end, in carrying out the preferred embodiment of my invention, I construct a tubular valve-casing with two successive valve-seats, providing a free plunger of packing material acting against the one seat, a metallic plunger acting against the other seat, and having a stem protruding outwardly of the valve-casing, by which it can be moved inwardly off from its seat, and against the other plunger to move it from its seat, and I provide in connection with the stopper a swiveled packing, consisting of a washer or ring of packing material and an insulating piece of metal or other suitable substance rotatively connected to the cap and carrying the washer movable thereon, and I provide certain other features of improvement which will be hereinafter fully set forth.

Figure 1:
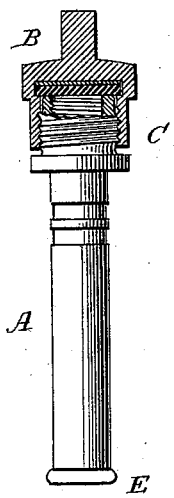
Figure 2:
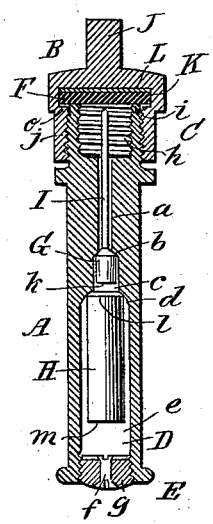
Figure 3:
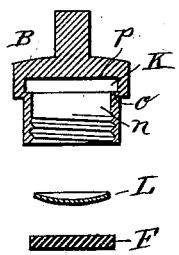

In the accompanying drawings, which illustrate certain adaptations of my invention, Figure 1 is a side elevation, partly in axial mid-section, of my improved valve and stopper, showing it in its preferred form as adapted for a pneumatic-tire valve. Fig. 2 is an axial section thereof. Fig. 3 is an axial section of the cap, washer-carrier, and packing-washer separated.

Referring to Figs. 1 to 3 of the drawings, let A indicate the valve-casing, B the cap or stopper therefor, C the pump or inlet end of the valve, D the conduit therethrough, and E the egress end of the valve.

According to the preferred form of my invention the valve-casing A consists of a single tubular metallic piece, and its conduit D is constructed with a contracted inlet-neck $a$, a tapering or otherwise suitably-shaped valve-seat $b$ at the inner end thereof, a cylindrical primary valve-chamber $c$, a secondary valve-seat $d$ at the inner end thereof and preferably having the shape of a segment of a sphere or other suitable annular tapering or contracting shape, an enlarged valve-chamber $e$ beyond said seat, and a contracted egress-duct $f$ at the end of said chamber. The duct is as usual formed by a tubular nut $g$ screwed into the screw-threaded end E of the casing A. At its inlet end the casing has the usual internally-screw-threaded socket $h$, into which the nipple of the pump may be screwed to feed air to the valve, and here the casing also has the usual stopper-seat $i$ and external screw-thread $j$, the cap B screwing onto the latter and clamping a packing-washer F against said washer-seat as usual.

In my improvements I provide a primary valve G seating against the seat $b$, and a secondary valve H seating against the seat $d$, the first contained in the primary chamber $c$ and the second in a secondary chamber $e$. The valve G is preferably a metallic valve having a tapering face engaging the seat $d$, and a downwardly-projecting head $k$, which is movable through the chamber c and against the valve H to unseat the latter. To move it the valve G is preferably provided with a slender stem I, which projects through the neck a and exteriorly thereof into or beyond the socket h. By pressing inwardly on this stem the valve can be unseated, and a sufficient inward pressure will bring it against the valve H and unseat the latter.

The valve H, I prefer to construct as a cylindrical imperforate bar of rubber having a flat end face l extending at right angles to its axis, and which constitutes its seating-face engaging the seat b. Preferably it is of nearly the same length as the chamber e and has an inner end face m identical with the face l and opposite the end nut g of the casing, by which nut or any other suitable provision the inward movement of the valve H is limited.

By constructing the seat d of partially spherical form, or contracting it from the valve outwardly, and the valve H with a flat or yielding seating-face, the corners of this face when it enters and embraces the seat readily find a true and proper position thereon and thus make a tight closure, which increases its area of contact in proportion to the increase of discharge pressure within the valve by reason of the compression of the rubber as it is forced against and into the seat. By providing like faces on both ends of the valve H it can be reversed when one end becomes impaired, and thus its effective life is doubled.

In using my invention it is generally unnecessary to employ a spring for either of the valves G or H, since the former is so diminutive that it is readily held to its seat by the egress pressure from within, and the latter, being constructed of rubber or other suitable like soft packing material, is quickly moved against and accurately held at and seated in its seat by the pressure from within. The valve H being imperforate at its faces avoids the necessity of any metallic closing-cap over its inactive end, and being of yielding or compressible rubber or the like can compress as its end is forced into the seat by the pressure within, thus tightly fitting home in the seat.

In operation both the valves will ordinarily be seated, but should either for any cause leak the other will check the outflow due to leakage. Normally the valve H will be sufficient to make a tight closure, and any inward vibration or unseating of the valve G will be unimportant because of the effectiveness of the valve H. Should the latter, however, by any possibility be imperfectly seated, the valve G will prevent escape of the air until there is a substantial equilibrium of pressure on all sides of the valve H, whereupon the latter will be able to fall unseated and will remain so until a slight leakage at the valve G occurs, in which event the valve H will immediately reseat itself. In this unseating and reseating of the valve H, by reason of its being a passive member and entirely free of movement, it will find a different seating position at each succeeding closure, and such change of position gives great probability of avoidance of the cause leading to any previous imperfect seating. The usual cause for imperfect seating is the lodging of grit upon the seat or the seating-face, and any such grit is liable to be displaced in the unseating operation. To deflate the valve pressure is applied to the outer end of the stem I in any suitable way, as by passing the point J of the cap into the socket h and against the stem, this pressure being continued until the head k of the valve G strikes the face l of the valve H and moves the latter inwardly off from its seat.

In my improved stopper or cap the usual packing-washer carried by the stopper or cap is rotatively mounted relatively thereto, so that when it is engaged by the washer-seat as the cap is screwed home the packing may remain stationary relative to the seat while the cap continues to rotate. This may be variously accomplished, according to the particular construction of the cap or stopper; but I prefer to employ the construction shown in Figs. 1 to 3, in which the cap or stopper B is constructed with an enlarged cylindrical packing-socket K at the upper end of its screw-threaded portion n, and with a square annular shoulder o between this portion and the socket, and a disk-shaped insulating-piece or packing-carrier L is provided in this socket and interposed between the body of the stopper and the packing-washer F. Preferably both the carrier L and the washer F are of greater diameter than the portion n of the cap and fit loosely and movably in the socket K thereof above the shoulder o, being prevented by the latter from escaping. To permit of the insertion of the carrier L it is desirable to bend or cut it slightly, so that it may be dropped through the screw-threaded neck m, after which it may be flattened or spread radially until its diameter exceeds that of the neck. The washer F can be subsequently sprung through the neck without difficulty because of its flexible and yielding character. The carrier L is preferably a brass disk, to which the rubber washer F quickly adheres by reason of the affinity of rubber for brass. The brass freely rotates on the flat face p of the socket K when the cap is turned after the washer contacts with its seat. In practice the washer, when thus used without distortion, is much more effective in making a tight closure, and its durability is much greater than in former constructions.

It will be seen that my invention provides an improved valve and an improved stopper which can be variously availed of, and it will be understood that the invention is not limited to the particular combination of parts or details of construction described as constituting its preferred form, since these may be modified as circumstances or the judgment of those skilled in the art may dictate without departing from the spirit of the invention.

What I claim is—

In a valve, a valve-casing having an internal conduit, a valve-seat and a valve-chamber, in combination with a valve H in said chamber and engaging said seat, and consisting of a passive and freely-movable imperforate cylindrical body, of compressible packing material, unconnected to said casing, substantially as and for the purpose set forth.

In witness whereof I have hereunto signed my name in the presence of two subscribing witnesses.

GEORGE H. F. SCHRADER.

Witnesses:
GEORGE H. FRASER,
THOMAS F. WALLACE.